(12) United States Patent
Weber et al.

(10) Patent No.: US 9,114,877 B2
(45) Date of Patent: Aug. 25, 2015

(54) METHOD AND SYSTEM FOR VEHICLE THERMAL MANAGEMENT

(75) Inventors: Kent I. Weber, Loves Park, IL (US); Athanasios Kyriazopoulos, Roscoe, IL (US); Peter C. Hightower, Belvidere, IL (US); Lance F. Miller, Rockford, IL (US); Ronald J. Soave, Roscoe, IL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 320 days.

(21) Appl. No.: 12/870,947

(22) Filed: Aug. 30, 2010

(65) Prior Publication Data
US 2012/0048509 A1  Mar. 1, 2012

(51) Int. Cl.
| B64D 15/04 | (2006.01) |
| B64D 11/00 | (2006.01) |
| B64D 13/00 | (2006.01) |

(52) U.S. Cl.
CPC ............ B64D 11/0015 (2013.01); B64D 13/00 (2013.01); *Y02T 50/54* (2013.01); *Y02T 50/545* (2013.01); *Y02T 50/56* (2013.01)

(58) Field of Classification Search
USPC ................................ 244/134 R, 134 B, 118.5
See application file for complete search history.

(56) References Cited

U.S. PATENT DOCUMENTS

| 3,711,044 | A | * | 1/1973 | Matulich .................... 244/118.5 |
| 3,981,466 | A | * | 9/1976 | Shah .......................... 244/134 R |
| 5,098,036 | A | * | 3/1992 | Brigham et al. ............ 244/134 R |
| 5,143,329 | A | * | 9/1992 | Coffinberry .................. 244/209 |
| 5,222,696 | A | * | 6/1993 | Brigham et al. ............ 244/134 R |
| 5,228,643 | A | * | 7/1993 | Manda et al. ............... 244/134 B |
| 5,484,122 | A | | 1/1996 | DeSalve |
| 5,490,645 | A | * | 2/1996 | Woodhouse ................ 244/118.5 |
| 5,558,303 | A | * | 9/1996 | Koethe et al. .............. 244/134 R |
| 5,813,630 | A | * | 9/1998 | Williams .................... 244/118.5 |
| 5,845,848 | A | * | 12/1998 | Amako et al. ................ 239/129 |
| 6,305,156 | B1 | | 10/2001 | Lui |
| 6,460,353 | B2 | | 10/2002 | Udobot et al. |
| 6,592,075 | B2 | * | 7/2003 | Wilson et al. .............. 244/118.5 |

(Continued)

FOREIGN PATENT DOCUMENTS

JP          2006283711 A        10/2006

OTHER PUBLICATIONS

Unofficial English Translation of Chinese Office Action issued in connection with corresponding CN Application No. 201110269992.4 on Nov. 15, 2014.

*Primary Examiner* — Brian M O'Hara
*Assistant Examiner* — Keith L Dixon
(74) *Attorney, Agent, or Firm* — General Electric Company; William S. Munnerlyn

(57) ABSTRACT

A method and system for thermal management includes an engine heat exchanger configured to transfer waste heat from an engine to a heat transfer fluid and an engine exhaust heat exchanger coupled in flow communication with the engine heat exchanger wherein the engine exhaust heat exchanger is configured to transfer heat from an exhaust of the propulsive engine to the pumped heat transfer fluid. A bypass valve is coupled in parallel with the engine exhaust heat exchanger wherein the bypass valve is selectable to modulate a flow of the heat transfer fluid through the engine exhaust heat exchanger and a plurality of accessory heat exchangers that are coupled in flow communication with at least one of the engine heat exchanger and the engine exhaust heat exchanger and each of the plurality of accessory heat exchangers flow is controllable using a modulating valve.

20 Claims, 2 Drawing Sheets

(56) References Cited

U.S. PATENT DOCUMENTS

| | | | |
|---|---|---|---|
| 6,663,044 B1 * | 12/2003 | Munoz et al. | 244/118.5 |
| 6,817,575 B1 * | 11/2004 | Munoz et al. | 244/118.5 |
| 7,171,819 B2 | 2/2007 | Lui et al. | |
| 7,305,842 B1 | 12/2007 | Schiff | |
| 7,398,641 B2 * | 7/2008 | Stretton et al. | 60/39.093 |

* cited by examiner ary embodiment of the present invention.

METHOD AND SYSTEM FOR VEHICLE THERMAL MANAGEMENT

BACKGROUND OF THE INVENTION

The field of the invention relates generally to vehicle thermal management, and more specifically, to a method and systems for managing waste heat and supplying heat to various loads in an aircraft.

Aircraft of the type known as "more electric aircraft" are using electric heating for anti-icing. The anti-ice electric loads are high, causing the need for the aircraft electrical system to be oversized in order to accommodate these high electrical loads. This results in excessive weight of the electrical generation and distribution system, excessive engine power extraction, and reduced electrical system efficiency during most of the flight, when anti-ice is not required.

At least some known have used engine bleed air to pressurize the cabin, power the air cycle environmental control system (ECS), and heat the leading edges of the wings and tail to prevent ice formation. Aircraft manufacturers are, moving toward more electric power and away from hydraulic and bleed air. In some cases, bleed air is eliminated, entirely, with these functions being replaced by electrically powered components. The more electric aircraft provides cabin air via an electric motor-driven compressor. A vapor cycle ECS provides, cabin cooling as needed for passenger and crew comfort. The anti-ice functions are performed by electric heaters. These heaters consume a large portion of the total aircraft electrical power, even though they are used for only a small portion of a typical flight. The anti-ice electrical power requirements are a major factor in sizing of the aircraft generators, adding considerable weight to the electrical generating and distribution system. The generators are oversized for the loads encountered during the major portion of the flight and operate less efficiently than they would if anti-ice were provided by another means.

BRIEF DESCRIPTION OF THE INVENTION

In one embodiment, a thermal management system (TMS) includes an engine heat exchanger configured to transfer waste heat from a propulsive engine to a pumped heat transfer fluid and an engine exhaust heat exchanger coupled in flow communication with the engine heat exchanger wherein the engine exhaust heat exchanger is configured to transfer heat from an exhaust of the propulsive engine to the pumped heat transfer fluid. The TMS further includes a bypass valve coupled in parallel with the engine exhaust heat exchanger wherein the bypass valve is selectable to modulate a flow of the pumped heat transfer fluid through the engine exhaust heat exchanger and a plurality of accessory heat exchangers for each of a plurality of heat loads of a vehicle that are coupled in flow communication with at least one of the engine heat exchanger and the engine exhaust heat exchanger and each of the plurality of accessory heat exchangers flow is controllable using a modulating valve.

In another embodiment, a method of anti-icing using a thermal management system (TMS) includes recovering waste heat in an engine using a heat exchanger, pumping a heat transfer fluid carrying the recovered waste heat from the heat exchanger to a heat load coupled in fluid communication with the heat exchanger, and transferring the recovered heat from the heat transfer fluid to the heat load.

In yet another embodiment, an aircraft includes an engine including a nacelle, the nacelle including a nacelle anti-icing heat exchanger, a wing including a wing anti-icing heat exchanger, a cargo bay including a heat exchanger, and a thermal management system including an engine heat exchanger coupled in thermal communication with a portion of the engine containing excess heat and a fluid pump coupled in flow communication between the engine heat exchanger and at least one of the nacelle anti-icing heat exchanger, the wing anti-icing heat exchanger; and the cargo bay heat exchanger.

BRIEF DESCRIPTION OF THE DRAWINGS

FIG. 1 is a perspective view of an aircraft in accordance with an exemplary embodiment of the present invention; and FIG. 2 is a schematic block diagram of a thermal management system (TMS) in accordance with an exemplary embodiment of the present invention.

DETAILED DESCRIPTION OF THE INVENTION

The following detailed description illustrates embodiments of the invention by way of example and not by way of limitation. It is contemplated that the invention has general application to sub-systems and methodical processes that manage thermal energy to improve an overall efficiency of a system in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
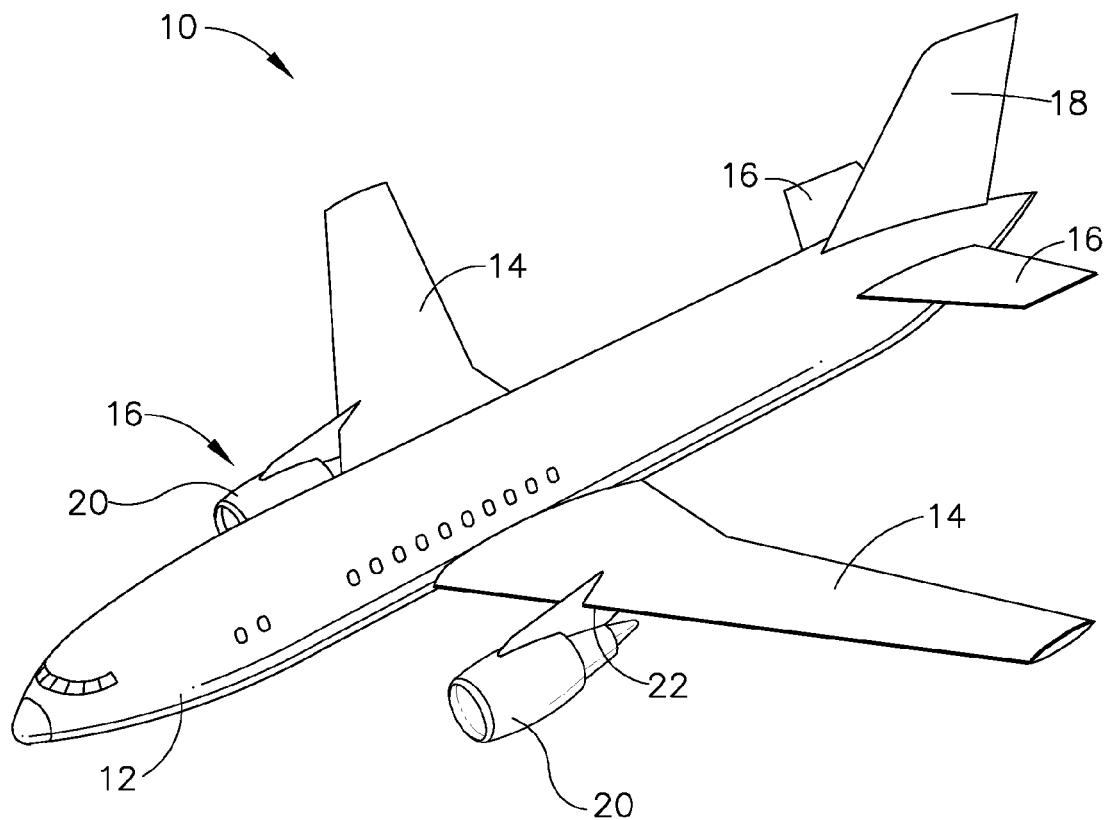
FIGS. 1-2 show exemplary embodiments of the method and system described herein.

FIG. 1 is a perspective view of an aircraft 10 in accordance with an exemplary embodiment of the present invention. In the exemplary embodiment, aircraft 10 includes a fuselage 12, wings 14, horizontal stabilizers 16, a vertical stabilizer 18, aircraft engines 20, and pylons 22. Wings 14 are primary lift providers for aircraft 10. Horizontal stabilizers 16 facilitate preventing an up-down motion of the aircraft nose, and vertical stabilizer 18 facilitates preventing side to side swinging. Engines 20 provide thrust for aircraft 10 and pylons 22 serve as underwing mounts for the engines.

Figure 2:
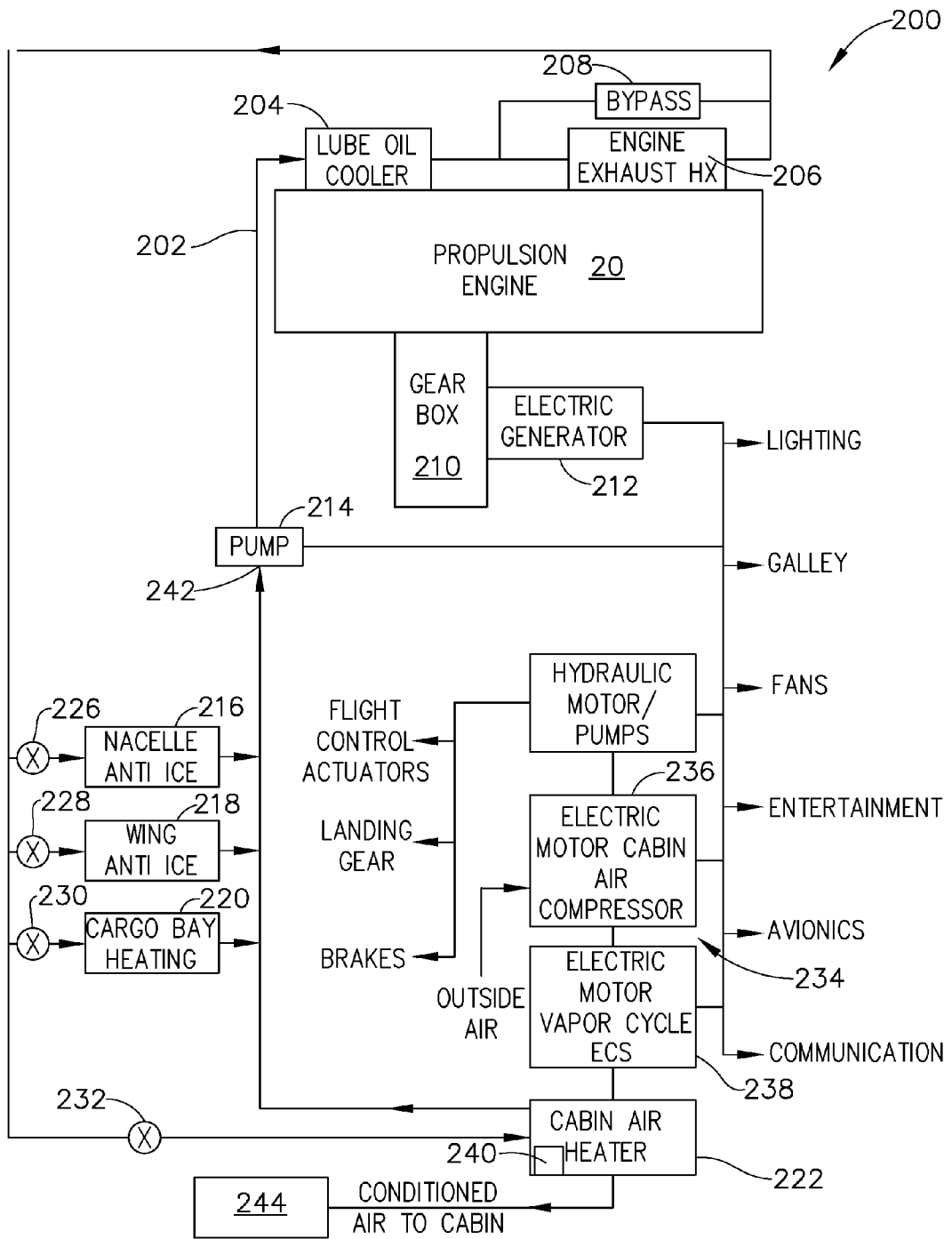

FIG. 2 is a schematic block diagram of a thermal management system (TMS) 200 in accordance with an exemplary embodiment of the present invention. In the exemplary embodiment, TMS 200 includes a heat transfer loop 202 that gathers waste heat from aircraft engine 20 and distributes this heat to locations where heating is needed. TMS 200 provides thermal energy to many areas which would otherwise use electrical power for electric heaters.

Using waste heat instead of electric heat facilitates improving the overall efficiency of aircraft 10. Electrical system efficiency is improved by operation at a higher average percentage of full load.

TMS 200 includes an engine heat exchanger 204 configured to transfer waste heat from propulsive aircraft engine 20 to a pumped heat transfer fluid circulating through heat transfer loop 202. In various embodiments, engine heat exchanger 204 may be embodied in a lube oil cooler or other heat exchanger configured to remove waste heat from engine 20 and transfer it to the heat transfer fluid. TMS 200 also includes an engine exhaust heat exchanger 206 coupled in flow communication with engine heat exchanger 204. Engine exhaust heat exchanger 206 is configured to transfer heat from an exhaust (not shown) of propulsive aircraft engine 20 to the pumped heat transfer fluid when additional heat is required. In one embodiment, engine exhaust heat exchanger 206 is coupled in serial flow communication with engine heat exchanger 204. A bypass valve 208 is coupled in parallel with engine exhaust heat exchanger 206 and is selectable to modulate a flow of the pumped heat transfer fluid through engine exhaust heat exchanger 206 in response to a demand for more or less heat. TMS 200 also includes a plurality of accessory heat exchangers for each of a plurality of heat loads of aircraft 10 coupled in flow communication with at least one of engine heat exchanger 204 and engine exhaust heat exchanger 206. A flow through one or more of the plurality of accessory heat exchangers is controllable using an associated modulating valve or a plurality of heat exchangers may be ganged together and controlled by a single modulating valve.

In the exemplary embodiment, heat for use by TMS 200 is recovered from cooling oil of engine 20. Cooling the oil, in turn cools engine 20, a gearbox 210, and accessories including the aircraft electrical generators 212.

The heating oil is pumped by a heat transfer fluid pump 214 coupled in flow communication with the plurality of accessory heat exchangers, which include, for example, but not limited to, a nacelle anti-ice heat exchanger 216, a wing anti-ice heat exchanger 218, a cargo bay heating heat exchanger 220, and a cabin air heater heat exchanger 222. In the exemplary embodiment, TMS 200 includes a modulating valve associated with each heat exchanger. Nacelle modulating valve 226 is associated with nacelle anti-ice heat exchanger 216, a wing modulating valve 228 is associated with wing anti-ice heat exchanger 218, a cargo bay heating modulating valve 230 is associated with cargo bay heating heat exchanger 220, and a cabin air heater modulating valve 232 is associated with cabin air heater heat exchanger 222.

In the exemplary embodiment, TMS 200 includes a cabin air compressor heat removal system 234 configured to transmit heat from a cabin air compressor 236 to a cabin 236 of aircraft 10. More electric airplanes have large cabin air compressors, for example, which need considerable cooling for the motor controller, the electric motor, the compressor, and the exit air, which may be too warm for passenger comfort. In another embodiment, cabin air compressor heat removal system 234 is configured to transmit heat from cabin air compressor 236 to an environmental control system 238. In various embodiments, TMS 200 includes a mixing valve 240 configured to mix conditioned air from cabin air compressor heat removal system 234 and cabin air heater heat exchanger 222 to provide conditioned air to cabin 244.

TMS 200 directs warm flowing fluid to surfaces requiring anti-ice including the engine nacelle, the wing leading edges, and horizontal stabilizers. There are some flight conditions where additional cabin heating is required, so cabin air heater heat exchanger 222 is included. There may be a need for cargo bay heating or heating of other non-conditioned areas; TMS 200 can accommodate these also.

Heat transfer fluid pump 214 is an electric motor driven fluid pump which circulates a heat transfer fluid, such as, a water/propylene glycol mixture around heat transfer loop 202.

During operation, the heat transfer fluid first passes through engine heat exchanger 204 to cool the oil to a suitable temperature for lubrication of engine 20 and engine driven accessories that are cooled rejecting heat to the engine lubricating oil. These accessories typically include engine driven fuel pumps, aircraft electrical generators 212, emergency power generators and emergency hydraulic pumps, with the result that essentially all of the accessories waste heat ends up in the lube oil and is transferred to heat transfer loop 202.

There may be situations where this lube oil waste heat is sufficient to provide all of the heating needs of the remainder of heat transfer loop 202. In this case, no additional heat gain is required and bypass valve 208 is opened, routing heat transfer fluid around engine exhaust heat exchanger 206. If the heat transfer fluid temperature exiting engine heat exchanger 204 is too low, bypass valve 208 is closed as necessary to route some or all of the heat transfer fluid through the engine exhaust heat exchanger 206.

In one embodiment, bypass valve 208 is adjusted continuously to maintain a constant heat transfer fluid outlet temperature after the bypassed fluid and fluid routed through the engine exhaust heat exchanger mixes. This control approach provides a constant heat transfer fluid temperature to the downstream devices requiring heating.

Warm mixed fluid is then directed to all of the devices to be heated in a parallel flow arrangement so that each user can operate independently, taking the heat it requires.

The modulating valve for each of the parallel loops may be a simple on/off valve that is turned on when heating is required. It can also be a modulating valve that adjusts the flow rate to maintain constant heating rate or constant fluid outlet temperatures or other heating parameter that is appropriate for the device.

Another way to control the fluid flow to a particular device is to pulse an on/off valve at a variable duty cycle to get the effect of a modulating valve with a simpler on/off valve.

Fluid exiting the parallel loops rejoins the main loop and is directed to an inlet 242 of heat transfer fluid pump 214, where the heat collecting process repeats.

There may be other sources of waste heat on the aircraft that could easily be cooled with heat transfer loop 202. Heat transfer loop 202 could be routed to devices such as this to capture their waste heat, avoiding a separate cooling loop in many cases.

If many sources and sinks of heat can benefit from a thermal management loop, it may be desirable to arrange multiple loops, each at a different temperature. Electronics typically require a relatively low temperature for heat pickup, and a similar low temperature is used for passenger comfort while heating the cabin. The electronics cooling loop may therefore be separate from a higher temperature loop, which cools lube oil and heats the leading edge of the wing to provide wing anti-icing.

The above-described embodiments of a method and system of thermal management provides a cost-effective and reliable means of using waste heat to perform heating tasks that would otherwise be provided by wasteful electrical heaters. More specifically, the methods and systems described herein facilitate enhancing the more electric aircraft by reducing the size of the electrical system and improving the electrical system efficiency. In addition, study results have shown that the more electric aircraft reduces aircraft fuel consumption. The TMS facilitates providing an additional reduction in aircraft fuel consumption. As a result, the methods and systems described herein facilitate operating an aircraft or other vehicle in a cost-effective and reliable manner.

Exemplary methods and system for managing thermal energy in a vehicle are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A thermal management system (TMS) comprising:
  an engine heat exchanger comprising an engine liquid system of a propulsive engine of a vehicle, said engine liquid system configured to channel a flow of lube oil therethrough that recovers waste heat conducted from engine accessories of the vehicle, wherein said engine heat exchanger facilitates transferring the waste heat from the lube oil to a pumped heat transfer fluid channeled through said engine heat exchanger;
  an engine exhaust heat exchanger coupled in serial flow communication with said engine heat exchanger, said engine exhaust heat exchanger configured to transfer heat from an exhaust stream of the propulsive engine to the pumped heat transfer fluid;
  a bypass valve coupled in parallel with said engine exhaust heat exchanger, said bypass valve selectable to modulate a flow of the pumped heat transfer fluid through the engine exhaust heat exchanger; and
  a plurality of accessory heat exchangers for each of a plurality of heat loads of the vehicle coupled in flow communication with at least one of said engine heat exchanger and said engine exhaust heat exchanger, each said plurality of accessory heat exchangers flow controllable using a modulating valve.

2. A thermal management system in accordance with claim 1, wherein said engine exhaust heat exchanger is coupled in serial flow communication with said engine heat exchanger.

3. A thermal management system in accordance with claim 1, further comprising a heat transfer fluid pump coupled in flow communication with said plurality of accessory heat exchangers.

4. A thermal management system in accordance with claim 1, wherein said plurality of accessory heat exchangers includes at least one of a nacelle anti-ice heat exchanger, a wing anti-ice heat exchanger, a cargo bay heating heat exchanger, and a cabin air heater heat exchanger.

5. A thermal management system in accordance with claim 1, further comprising a cabin air compressor heat removal system configured to transmit heat from a cabin air compressor to a cabin of a vehicle.

6. A thermal management system in accordance with claim 1, further comprising a cabin air compressor heat removal system configured to transmit heat from a cabin air compressor to an environmental control system.

7. A thermal management system in accordance with claim 1, further comprising a mixing valve configured to mix conditioned air from a cabin air compressor heat removal system and a cabin air heater heat exchanger to provide conditioned air to a cabin of a vehicle.

8. A method of anti-icing using a thermal management system (TMS) comprising:
  positioning an engine heat exchanger including an engine liquid system in thermal communication with a heat transfer fluid;
  recovering waste heat conducted from engine accessories of an engine of a vehicle, the waste heat recovered by a flow of lube oil flowing through the engine liquid system;
  channeling the heat transfer fluid and the flow of lube oil through the engine heat exchanger such that the recovered waste heat is transferred from the flow of lube oil to the heat transfer fluid;
  pumping the heat transfer fluid carrying the recovered waste heat from the heat exchanger to a heat load of the vehicle coupled in fluid communication with the heat exchanger; and
  transferring the recovered heat from the heat transfer fluid to the heat load.

9. A method in accordance with claim 8 wherein recovering waste heat comprises recovering waste heat from a lube oil cooler in the engine.

10. A method in accordance with claim 8 wherein recovering waste heat comprises recovering waste heat from an engine exhaust heat exchanger positioned at least one of in an exhaust stream of the engine and proximate the exhaust stream of the engine.

11. A method in accordance with claim 10 further comprising bypassing the pumped heat transfer fluid around the engine exhaust heat exchanger using a bypass valve.

12. A method in accordance with claim 11 further comprising maintaining a substantially constant temperature of the heat transfer fluid downstream of the engine exhaust heat exchanger using the bypass valve.

13. A method in accordance with claim 8 wherein pumping the heat transfer fluid comprises pumping a water and glycol solution through a closed loop heat transfer circuit.

14. A method in accordance with claim 8 wherein pumping the heat transfer fluid comprises pumping the heat transfer fluid carrying the recovered waste heat to at least one of a plurality of heat loads.

15. A method in accordance with claim 8 wherein pumping the heat transfer fluid comprises pumping the heat transfer fluid carrying the recovered waste heat to at least one of a nacelle anti-ice heat exchanger, a wing anti-ice heat exchanger, a cargo bay heating heat exchanger, and a cabin air heater heat exchanger.

16. An aircraft comprising:
  an engine including a nacelle, said nacelle comprising a nacelle anti-icing heat exchanger;
  a wing comprising a wing anti-icing heat exchanger;
  a cargo bay comprising a heat exchanger; and
  a thermal management system comprising:
    an engine heat exchanger comprising an engine liquid system configured to channel a flow of lube oil therethrough, the flow of lube oil coupled in thermal communication with engine accessories such that excess heat generated therefrom is recovered by the lube oil; and
    a fluid pump coupled in flow communication between said engine heat exchanger and at least one of said nacelle anti-icing heat exchanger, said wing anti-icing heat exchanger; and said cargo bay heat exchanger, said fluid pump configured to pump heat transfer fluid through said engine heat exchanger such that the excess heat is transferred from the lube oil to the heat transfer fluid, wherein the heat transfer fluid carries the excess heat towards at least one of said nacelle anti-icing heat exchanger, said wing anti-icing heat exchanger; and said cargo bay heat exchanger.

17. A system in accordance with claim 16 further comprising an engine exhaust heat exchanger coupled in thermal communication with a portion of the engine exhaust and coupled in flow communication to said engine heat exchanger and at least one of said nacelle anti-icing heat exchanger, said wing anti-icing heat exchanger; and said cargo bay heat exchanger.

18. A system in accordance with claim 17 further comprising an engine exhaust heat exchanger bypass valve coupled in parallel flow with said engine exhaust heat exchanger, said bypass valve configured to be controlled to maintain a predetermined temperature of fluid downstream of said engine exhaust heat exchanger.

19. A system in accordance with claim 17 further comprising a cabin environmental control system configured to recover waste heat from a cabin air compressor motor and provide the waste heat to a cabin of the aircraft using a cabin air heater supplied with a heat transfer fluid from the thermal management system.

20. A system in accordance with claim 17, wherein said thermal management system further comprises a heat exchanger coupled in thermal communication with a source of excess heat and a second fluid pump coupled in flow communication between said heat exchanger and at least one heat load.

\* \* \* \* \*